US006952405B2

(12) United States Patent
Tsang et al.

(10) Patent No.: US 6,952,405 B2
(45) Date of Patent: Oct. 4, 2005

(54) CODING SCHEME USING A TRANSITION INDICATOR FOR SIGNAL TRANSMISSION IN OPTICAL COMMUNICATIONS NETWORKS

(75) Inventors: Danny Hin-Kwok Tsang, Acton, MA (US); Murat Azizoglu, North Billerica, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 914 days.

(21) Appl. No.: 09/794,949

(22) Filed: Feb. 27, 2001

(65) Prior Publication Data

US 2002/0156913 A1 Oct. 24, 2002

Related U.S. Application Data (60) Provisional application No. 60/251,341, filed on Dec. 5, 2000.

(51) Int. Cl.[7] .................................................. H04L 5/12
(52) U.S. Cl. ....................................... 370/252; 370/253
(58) Field of Search ................................. 370/252, 253, 370/231, 235; 709/228, 232, 236, 203, 201.3, 223, 227.9, 230.1, 243.4; 714/701, 707

(56) References Cited

U.S. PATENT DOCUMENTS

| | | | |
|---|---|---|---|
| 6,173,208 B1 * | 1/2001 | Park et al. | 700/83 |
| 6,317,433 B1 * | 11/2001 | Galand et al. | 370/395.2 |
| 6,718,491 B1 * | 4/2004 | Walker et al. | 714/701 |

OTHER PUBLICATIONS

*Transparent Mappings into SONET Paths for Block–Coded Data Formulas*, Tim Armstrong, et al., Jul. 10–14, 2000, Contribution to T1 Standards Project, T1X1.5/2000–146, pp. 1–6.

*Transparent GFP Mappings for Fibre Channel and ESCON*, Tim Armstrong, et al., Oct. 10–13, 2000, Contribution to T1 Standards Project, Digital Optical Hierachy, T1X1.5/2000–197, pp. 1–23.

*Revised Draft TI05.02 SONET Payload Mappings Standard*, Steven Gorshe, Aug., 1999, Contribution to T1 Standards Project, T1X1.5/99–066R1, pp. 1–22.

*GFP for Ethernet*, Tim Armstrong, et al., Jul. 10–14, 2000, Contribution to T1 Standards Project, T1X1.5/2000–107R1, pp. 1–6.

*Generic Framing Procedure (GFP) for Data over SONET/SDH (DoS)*, Enrique Hernandez–Valencia, et al., Jul. 10–14, 2000, Contribution to T1 Standards Project, T1X1.5/2000–147, pp. 1–17.

*A proposal for Virtual Concatenation of STS–3c SPEs*, Juergen Heiles, et al., Jul. 10–14, 2000, Contribution to T1 Standards Project, T1X1.5/2000–152, pp. 1–5.

*Synchronous Optical Network (SONET)—Payload mappings (inclusion of Virtual Concatenation)*, Mar. 2000, American National Standard for Telecommunications, Supplement to T1.105.02–2000, T1.105.02a–xxx, pp. 1–9.

* cited by examiner

*Primary Examiner*—Krisna Lim
(74) *Attorney, Agent, or Firm*—Weingarten, Schurgin, Gagnebin & Lebovici LLP (57) ABSTRACT

A coding scheme is provided transporting encoded information over an optical communications link to a network. Multi-word information groups are analyzed to determine whether each of the information groups includes control characters. If the information group does not include any control characters, an encoded information stream including a set data indicator and data words is generated. If the information group includes one or more control characters, an encoded information stream is generated which includes control code counters, a transition indicator, location pointers, control codes that are encoded from the control characters, and any data. Accordingly, the necessary bandwidth for transporting the information is reduced by using this encoded information stream without sacrificing any control information.

20 Claims, 5 Drawing Sheets

| INFORMATION DESCRIPTION | BIT 1 | BITS 2-9 | BITS 10-17 | BITS 18-25 | BITS 26-33 | BITS 34-41 | BITS 42-49 | BITS 50-57 | BITS 58-65 |
|---|---|---|---|---|---|---|---|---|---|
| ALL DATA | 0 | D1 | D2 | D2 | D4 | D5 | D6 | D7 | D8 |
| 1 CONTROL CODE | 1 | 0aaa C1 | D1 | D2 | D3 | D4 | D5 | D6 | D7 |
| 2 CONTROL CODES | 1 | 10aa abbb | C1 C2 | D1 | D2 | D3 | D4 | D5 | D6 |
| 3 CONTROL CODES | 1 | 110a aabb | bccc C1 | C2 C3 | D1 | D2 | D3 | D4 | D5 |
| 4 CONTROL CODES | 1 | 1110 aaab | bbcc cddd | C1 C2 | C3 C4 | D1 | D2 | D3 | D4 |
| 5 CONTROL CODES | 1 | 1111 0aaa | bbbc ccdd | deee C1 | C2 C3 | C4 C5 | D1 | D2 | D3 |
| 6 CONTROL CODES | 1 | 1111 10aa | abbb cccd | ddee efff | C1 C2 | C3 C4 | C5 C6 | D1 | D2 |
| 7 CONTROL CODES | 1 | 1111 110a | aabb bccc | ddde eef | fggg C1 | C2 C3 | C4 C5 | C6 C7 | D1 |
| 8 CONTROL CODES | 1 | 1111 1110 | aaab bbcc | cddd eeef | ffgg ghhh | C1 C2 | C3 C4 | C5 C6 | C7 C8 |

LEGEND aaa-hhh = 3-bit representation of the first eighth control code's original positions
$C_i$ = 4-bit representation of the of the i-th control code
$D_i$ = 8-bit representation of the i-th data
After the positions of the control codes are determined, the remaining positions are filled by the data in ascending order starting with D1.

*FIG. 6*

CODING SCHEME USING A TRANSITION INDICATOR FOR SIGNAL TRANSMISSION IN OPTICAL COMMUNICATIONS NETWORKS

CROSS REFERENCE TO RELATED APPLICATIONS

This application claims priority under 35 U.S.C. §119(e) to provisional patent application Ser. No. 60/251,341, filed Dec. 5, 2000, the disclosure of which is hereby incorporated by reference.

STATEMENT REGARDING FEDERALLY SPONSORED RESEARCH OR DEVELOPMENT

N/A

BACKGROUND OF THE INVENTION

The present invention relates to an efficient transport of encoded traffic in optical communications networks employing synchronous signaling techniques, such as networks employing Synchronous Optical Network (SONET) or Synchronous Digital Hierarchy (SDH) signaling formats.

A large number of wavelength-division multiplexed (WDM) point-to-point transmission systems and WDM networks presently exist. Many of these systems have been designed to support a fixed number of wavelengths and a predetermined data format. SONET is a common framing format for data transport in long-haul and metropolitan-area WDM carrier networks. The SONET frame provides a convenient standard mechanism to multiplex and transport circuit-switched traffic in high-speed backbones and support network functions. As a result of its beneficial characteristics, SONET framing is presently used in most WDM systems.

In contrast to SONET framing, many packet-switched local area networks (LANs) use framing defined in the long-established Ethernet standard. Unlike SONET, Ethernet and other LAN protocols rely on non-synchronous signaling techniques. Ethernet has become the dominant LAN technology such that virtually all data traffic originates and terminates as an Ethernet frame with an IP header. Ethernet has evolved to become a switched technology in which there are no protocol related distance limitations and the only distance limitation remaining is due to the physical layer. Furthermore, Ethernet supports a wide range of transmission rates ranging from 10 Megabits per second (Mbps) for Ethernet service, 100 Mbps for Fast Ethernet (FE) service, 1 Gigabit per second (Gbps) for Gigabit Ethernet (GbE) service, and up to 10 Gbps Dense WDM (DWDM) and possibly higher rates in the near future.

Ethernet typically connects at the LAN edge via a router to a variety of WAN technologies, such as SONET/SDH, ATM, and T1. Carriers and service providers have addressed the demands for Ethernet, FE, GbE, and DWDM with high performance L2/L3 switches, optical fiber infrastructure, long reach Ethernet interfaces, and optical switches. However, problems result in meeting these demands due to the scarcity and expense of WAN bandwidth, the need for additional customer premises equipment, and the installation and administration of unfamiliar WAN interfaces. It is desirable to combine WAN technologies, such as SONET/SDH, with Ethernet by more efficiently utilizing the SONET/SDH bandwidth to transparently offer end to end carrier class Ethernet service with diverse bit rates.

Because SONET and GbE have been separately optimized for transport and data networking, these signaling mechanisms have been treated in an isolated manner. For instance, a typical WDM network with OC-48 interfaces can accept only SONET-framed traffic at the OC-48 rate (2.488 Gbps). A mechanism is not presently available for efficiently and transparently accepting variable-sized packets transmitted at a non-SONET rate, such as the 1.25 Gbps rate of a GbE network. Even though a SONET framer may be used to translate a GbE signal into an OC-48 SONET signal, this approach would result in an inefficient utilization of the available bandwidth (only about 40% of the available bandwidth is used) at each wavelength transporting such traffic.

SUMMARY OF THE INVENTION

In accordance with the present invention, methods and apparatus are provided for a coding scheme which efficiently and transparently transports information over an optical communications link to a network. Information containing data and control characters is encoded after segmenting the information into multi-word information groups and determining whether each of the information groups includes control characters. If the information group does not include any control characters, an encoded information stream including a data indicator and encoded data words is generated. If the information group includes one or more control characters, an encoded information stream is generated by encoding the control characters to control codes, encoding the data to encoded data words, generating a transition indicator based on the number of control characters present within each information group for indicating the occurrence of a final control code in the encoded information stream, and generating a location pointer for each control code representative of the sequential position within the information group for the control character corresponding to each control code. Then, the control codes, the data words, the location pointers, and the transition indicator are combined for each information group to form the encoded information stream. Accordingly, the necessary bandwidth for transporting the information is reduced after the encoding is completed without sacrificing any control information so that the information is transparently and efficiently transported over the communications link.

After transporting the encoded information stream over a network, the information may be decoded back to its original form. If the data indicator is set, only data will follow and the data is extracted from the encoded information stream. If the data indicator is not set, one or more control codes must follow. Therefore, the transition indicator and location pointer(s) are analyzed to determine the locations of the control code(s) within the encoded information stream. The control code(s) are decoded back to control characters and any remaining data word(s) are extracted from the encoded information stream for generating the information group of control characters and data.

The present coding scheme is applicable for transparently transporting GbE, Fibre Channel (FC), Enterprise Systems Connection (ESCON), Fiber Connector (FICON), and other data formats that have been encoded using block line codes for SONET paths. For instance, the data rate for GbE signals may be reduced so that the available bandwidth provided by the SONET/SDH signal is efficiently utilized. Furthermore, this coding scheme is particularly useful for transporting GbE signals using the SONET/SDH signaling format of STS-1/VC-3 or STS-3c/VC-4. The present coding scheme provides the necessary flexibility for allowing the available bandwidth to be used in the most efficient manner for 32B/33B and 64B/65B coding schemes as used in VC-3 in addition to being adaptable for many other coding schemes such as 256B/257B, 128B/129B, 16B/17B, 8B/9B.

BRIEF DESCRIPTION OF THE DRAWING

The invention will be more fully understood by reference to the following detailed description of the invention in conjunction with the drawings, of which.

DETAILED DESCRIPTION OF THE INVENTION

In accordance with the embodiments of the present invention, an efficient transport of packet traffic in optical communications networks is provided. Specifically, to transport traffic including basic MAC frames, MAC Control frames, and control characters across MAN/WAN, a transparent physical layer connectivity is provided for carrying the traffic via an efficiently sized SONET/SDH signal. The coding schemes according to the embodiments of the present invention may transparently transport FC, ESCON, FICON, GbE and other data formats that have been encoded using block line codes for SONET/SDH paths. It should be appreciated that the term "control character" will be used throughout the present application in place of the more conventionally used term control code and the term "control code" will be used to refer to the encoded control character. For example, the GbE control code that typically is an 8-bit value will be referred to as a control character and the encoded GbE control character that typically is a 4-bit value will be referred to as a control code.

Figure 1:
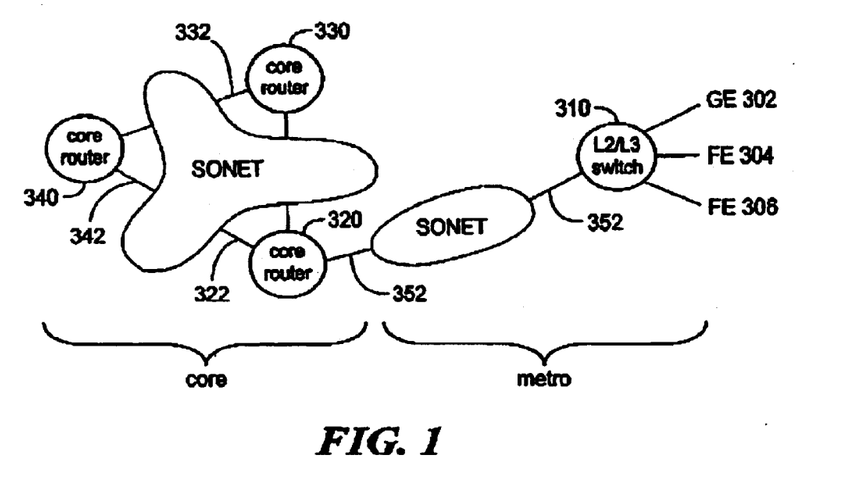
FIG. 1 is a block diagram illustrating the interconnectivity between a switch and routers according to an embodiment of the present invention.

As illustrated in FIG. 1, GbE and FE customer interfaces (GE 302, FE 304, and FE 306) are aggregated at an L2/L3 switch 310 at the network edge. The efficient encoding method according to an embodiment of the present invention, carries the encoded signal to the nearest GbE core router 320 over the SONET/SDH based MAN. GbE signals 322, 332, 342 and 352 encoded by this encoding method may also be transmitted between core routers 330 and 340 over long-haul SONET/SDH based networks. By this encoding method, the data-carrying capacity necessary for the GbE traffic may be minimized so that the signals are efficiently and transparently transported over the networks.

In the coding scheme for the embodiments of the present invention, signals using 8B/10B encoding which include both data information and control information are one example of signals that may be provided. 10B codes unused for data information are used to convey the control information. In order to provide transparent service, the combined data rate of the GbE signals must be reduced to be less than the maximum bandwidth of the output signal while maintaining the control overhead information. It is also desirable to provide transparent service for a single transmitted signal on an output signal which maximizes the utilization on the available bandwidth. Accordingly, coding schemes are provided in the embodiments of the present invention for encoding the transmitted signals so that they may be efficiently and transparently transported within the available bandwidth of the output signal to the network without sacrificing any control information.

Figure 2:
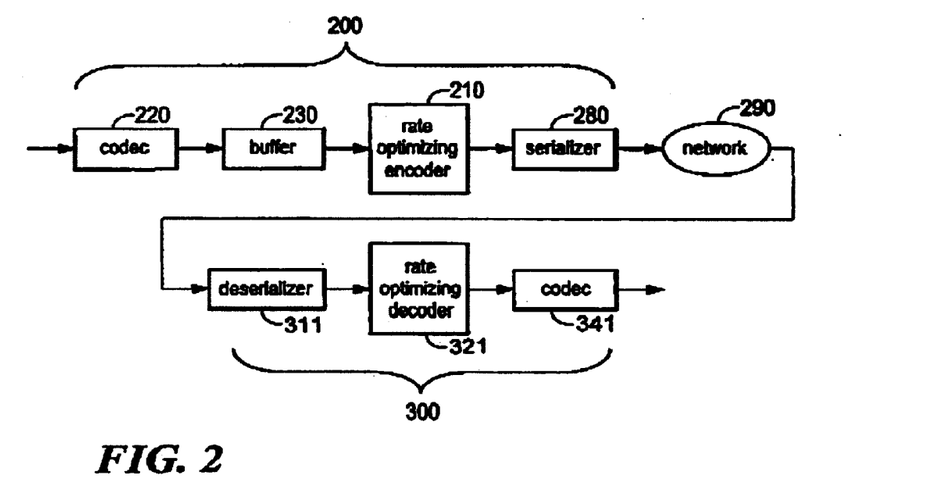
FIG. 2 is a block diagram illustrating the transmitting and receiving portions of a line interface of a communications node according to another embodiment of the present invention.

FIG. 2 illustrates an embodiment of the present invention including a transmitting portion 200, a network 290, and a receiving portion 300. At the transmitting portion 200, a rate optimizing encoder 210 receives a stream of GbE information groups, or word groups, which may contain data or control characters, to be transmitted to the network 290 via a serializer 280. The information groups are received by the rate optimizing encoder 210 via a codec 220 and a buffer 230 after the buffer 230 determines that a complete set of an information group has been received. The rate optimizing encoder 210 detects if the information group contains any control characters. If at least one control character is detected within the information group, the rate optimizing encoder 210 reads a control code from an internal encode map look up table (LUT, not shown) corresponding to each of the detected control characters contained in the information group. The control codes have fewer bits than the control characters contained in the information group. Optimally, the control codes include as few bits as possible to uniquely map each of the control characters. For instance, if 12 control characters are used, four bits are the minimum number of bits required to map each of these to control codes. In another example, if eight control characters are used, three bits are required to uniquely map each of these to control codes.

The rate optimizing encoder 210 generates a data indicator, or an indicator bit, when there are no control characters detected in the information group. For instance, the indicator bit may be set to a first logical level (the bit may be set to "0" for example) for indicating that only data will follow. When there are no control characters present, the indicator bit and the word group containing all data is sent to the serializer 280 which generates the encoded information stream to be sent to the network 290. Thereafter, the serializer 280 generates an encoded information stream.

Figure 3A:
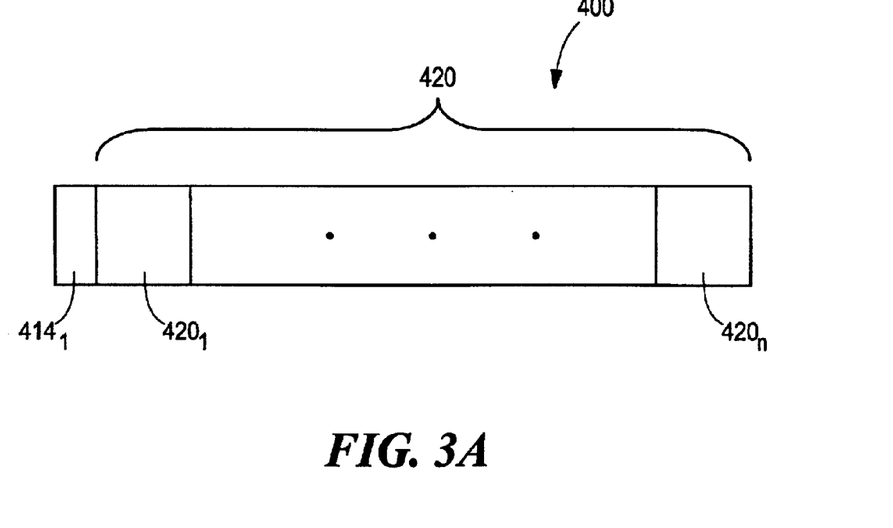
FIGS. 3(a) and 3(b) illustrate configurations of encoded information streams according to embodiments of the present invention.

FIG. 3(a) illustrates one example of a configuration for an encoded information stream 400, which includes a field $414_1$ for a data indicator and data fields $420_1, \ldots 420_n$, to be sent to the network 290. The encoded information stream 400 is configured in this manner when control characters are not present in the information group and only data is to be sent to the network 290. Therefore, the set data indicator is placed in field $414_1$ and the data is placed within the data fields $420_1, \ldots 420_n$ of the encoded information stream 400. In one example of segmenting the encoded information stream 400 when four 8-bit words are transmitted, a first bit is set as the data indicator in field $414_1$ and the data fields $420_1, 420_2, 420_3,$ and $420_4$ of the encoded information stream 400 are divided into four 8-bit fields for the data. It is understood that the data indicator field 414 and the data fields $420_1, \ldots 420_n$ may be arranged in many other predetermined orders within the encoded information stream 400.

Figure 3B:
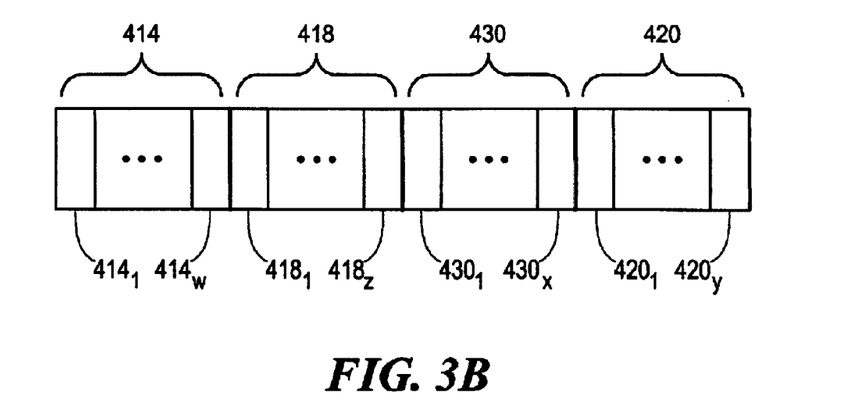

In FIG. 3(b), another example of a configuration for the encoded information stream 400 is illustrated which is used when one or more control characters are present within the information group. In this configuration, first and second fields 414 and 418 are utilized in addition to the data indicator field $414_1$. The first and second fields 414 and 418 are for storing information relating to the number of control characters and their sequential position within the information group. The sizes of these first and second fields 414 and 418 vary depending upon the number of control characters and words in the information group. Also, a control code field 430 having a variable number of control code sub-fields 430$_x$, corresponding in number to the control characters in the information group, are provided within the encoded information stream 400 for storing control code(s). At least one control code sub-field 430$_1$ must be present (for the case when only one control character is present within the information group) and control code sub-fields 430$_x$ equal in number to the words within the information group may be present (for the case when the information group contains all control characters).

The rate optimizing encoder 210 detects the control characters present in the information group and generates the information for storing in the first and second fields 414 and 418. When at least one control code is detected, the first field 414 includes a variable number of bits 414$_1$, . . . 414$_w$ including a transition indicator (preferably the last bit of the first field 414) for indicating that no more control characters are present in the information group. For instance, the first field 414 may include bits 414$_1$ . . . 414$_{w-1}$ set to a first logical level for each time that a control character is detected, to function as control code counters. The last bit 414$_w$ (the transition indicator) is set to a second logical level opposite to the first logical level when there are no more control characters within the information group, to indicate the end of the first field 414. The first field 414 also includes the data indicator 414$_1$ which is typically one unset bit (to a logical level opposite to the set data indicator), for indicating that at least one control character is present within the information group. For example, if four control characters are detected in the information group, the first field 414 includes five bits set to "11110", where the first "1" bit indicates that at least one control code is present, the next three "1" bits each indicate the presence of control codes, and the "0" bit or transition indicator $^{414}{}_w$ indicates the last control code within the encoded information stream 400 and a transition to data or the next encoded information stream will follow the last control code. If the encoded information stream contains only control codes, the transition indicator 414$_w$ signals the end of the encoded information stream.

Because the first field 414 only indicates the number of control characters present, the second field 418 is provided for indicating the sequential positions of the control characters within the information group. The second field 418 includes a variable number of sub-fields 418, corresponding in number to the control characters present. Each sub-field(s) 418$_z$ of the second field 418 has a fixed number of bits. For example, if 5–8 blocks or words are included in the information group, a sub-field 418$_z$ of 3-bits is preferably selected to represent the eight different positions where a control character may be found within the information group. If 1–4 blocks or words are included in the information group, a sub-field 418$_z$ of 2-bits is adequate to represent the four different positions where a control character may be present. For instance, if the information group includes eight words and control characters are present in the second and seventh words, the second field 418 would include six bits set to "010111" where the first 3-bit sub-field 418$_1$ includes bits "010" as a location pointer for a control character in the second word and the second 3-bit sub-field 418$_2$ includes bits "111" as a location pointer for a control character in the seventh word. Again, it should be appreciated that the first and second fields 414 and 418 and the sub-fields 418$_z$ may be arranged in other predetermined orders.

The rate optimizing encoder 210 also encodes the control characters to control codes and any data to encoded data words. The control codes are placed in the control code sub-fields 430$_x$ and the data words are placed in the data fields 420$_y$. Each of the control code sub-fields 430$_x$ are of the same size that is sufficient for the length of the control codes and each of the data fields 420$_y$ are of the same size that is sufficient for the length of the data words. Thereafter, the first and second fields 414 and 418, the control code field(s) 430$_x$ and data field(s) 420$_y$ are sent to the serializer 280 for generating the encoded information stream 400 to be sent to the network 290. It should be appreciated that the serializer 280 may arrange the fields 414 and 418 as desired by the user. Due to the fact that the sizes of these fields vary, it is important to set and detect the transition indicator between the control codes and the data or the next encoded information stream. Therefore, the control codes and the data words must be in prearranged sequential locations in the encoded information stream 400 so that the transition indicator 414$_w$ will signal such a transition. It is not necessary to have these fields be physically contiguous within the encoded information stream as long as the fields can be found according to predetermined logic. Accordingly, the encoded information stream 400 transports all of the control information and data to the network 290 at a lower data rate than that of the originally transmitted information group.

At the receiving end 300, a deserializer 311 receives the encoded information stream 400 from the network 290. The deserializer 311 extracts the data indicator 414$_1$ for determining whether any control codes are present. If the data indicator 414$_1$ is set, the data fields 420$_n$ are extracted and sent to a rate optimizing decoder 321. The rate optimizing decoder 321 outputs the received data words to a codec 341 for generating word groups in their originally transmitted form.

However, if the data indicator 414$_1$ is not set, the encoded information stream 400 includes at least one control code that must be decoded. In such cases, the rate optimizing decoder 320 reads the first and second fields 414 and 418 from the encoded information stream 400 and determines the number and original sequential location(s) of the control characters. The control code sub-field(s) 430$_x$ and the data fields 420$_y$, if any data is present, are then read and decoded by the rate optimizing decoder 320. The control characters and the decoded data words may then be combined in their proper order for outputting to the codec 340 so that the information group is generated which contains data and control characters in their originally transmitted form.

The coding scheme according to the embodiments of the present invention allows information to be transparently transported across the network at a reduced data rate by encoding the information to the encoded information stream before being transported across the network. After the encoded information stream has been received from the network, the encoded information stream is then decoded back to the original information group.

In one example of the present embodiment, the rate optimizing encoder 210 encodes 8-bit GbE control characters into 4-bit control codes through an encode map look up table (LUT, not shown). Table 1 illustrates one example for encoding 12 GbE control characters to 4-bit control codes. User-defined control features may also be supported by the four unused 4-bit control codes for sending undefined control codes for special purposes. In Table 1, the notation XX.Y represents the decimal value of the first 5 bits by XX and the decimal value of the last 3 bits by Y.

TABLE 1

| GbE Control Characters | Control Codes |
| --- | --- |
| K28.0 | 0000 |
| K28.1 | 0001 |
| K28.2 | 0010 |
| K28.3 | 0011 |
| K28.4 | 0100 |
| K28.5 | 0101 |
| K28.6 | 0110 |
| K28.7 | 0111 |
| K23.7 | 1000 |
| K27.7 | 1001 |
| K29.7 | 1010 |
| K30.7 | 1011 |
| User defined | 1100 |
| User defined | 1101 |
| User defined | 1110 |
| User defined | 1111 |

The rate optimizing decoder 320 includes a decode map LUT (not shown) containing similar information as in the encode map LUT. However, the decode map LUT uses this information to decode the control codes of the encoded information stream 400 back to their original control character form.

The coding scheme according to the present embodiment is particularly useful when a GbE signal is to be transported using the SDH signaling format VC-3. In the VC-3 format, which is the European equivalent of STS-1, only 84 columns, instead of 86 columns, are available for user data, such as GbE data and GbE control characters. This coding scheme is particularly useful for 32B/33B and 64B/65B coding schemes of VC-3, but is also applicable for 256B/257B, 128B/129B, and 16B/17B and 8B/9B coding schemes. Specifically, the 64B/65B encoding for 8 byte blocks with this coding scheme provides a data rate of 1.015625 Gbps, which is less than the available bandwidth of 21 VC-3 (1.016 Gbps), and allows the signal to be efficiently transported over the available bandwidth.

Figure 4:
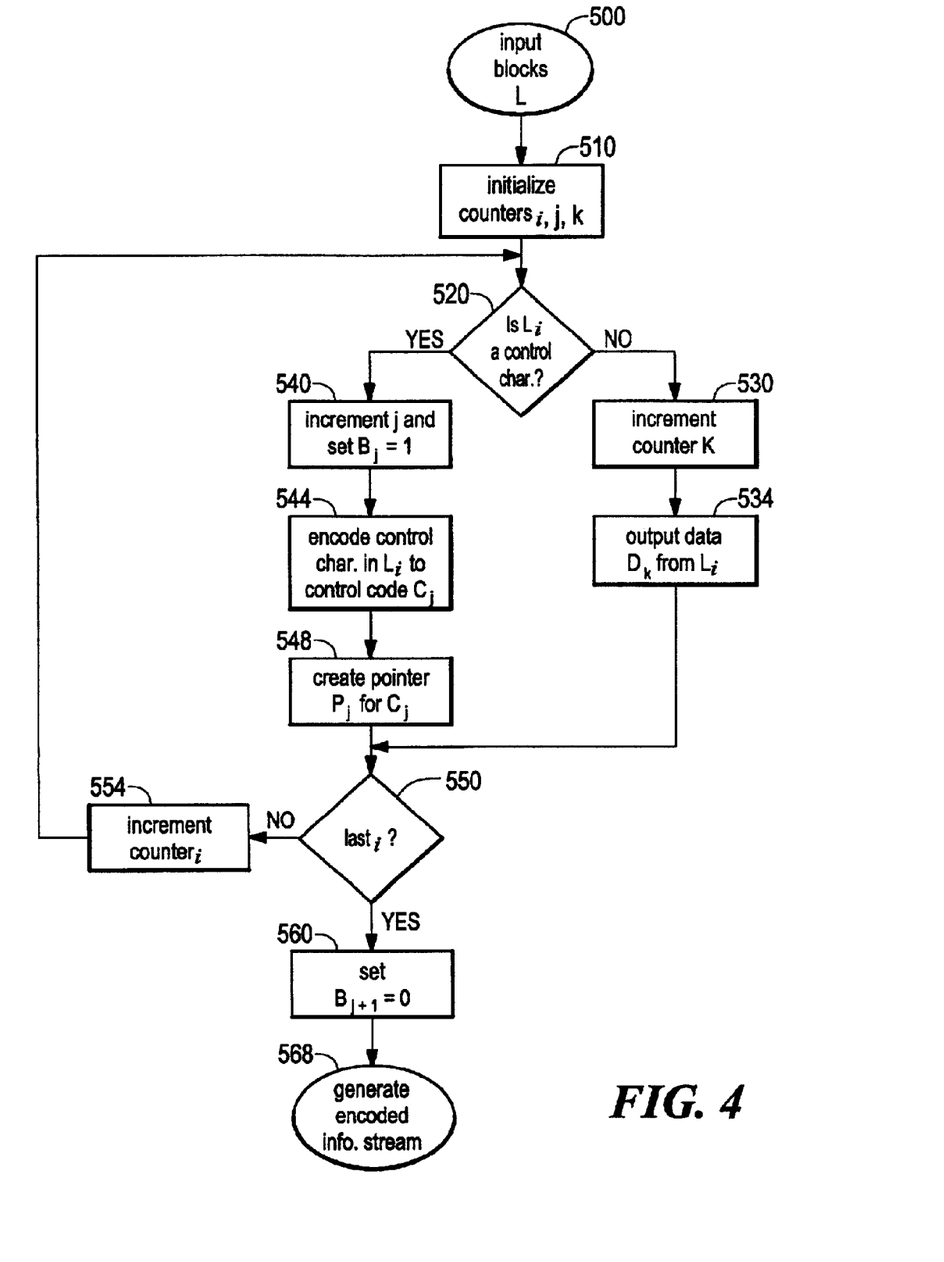
FIG. 4 is a flowchart for an encoding algorithm according to an embodiment of the present invention.
Figure 5:
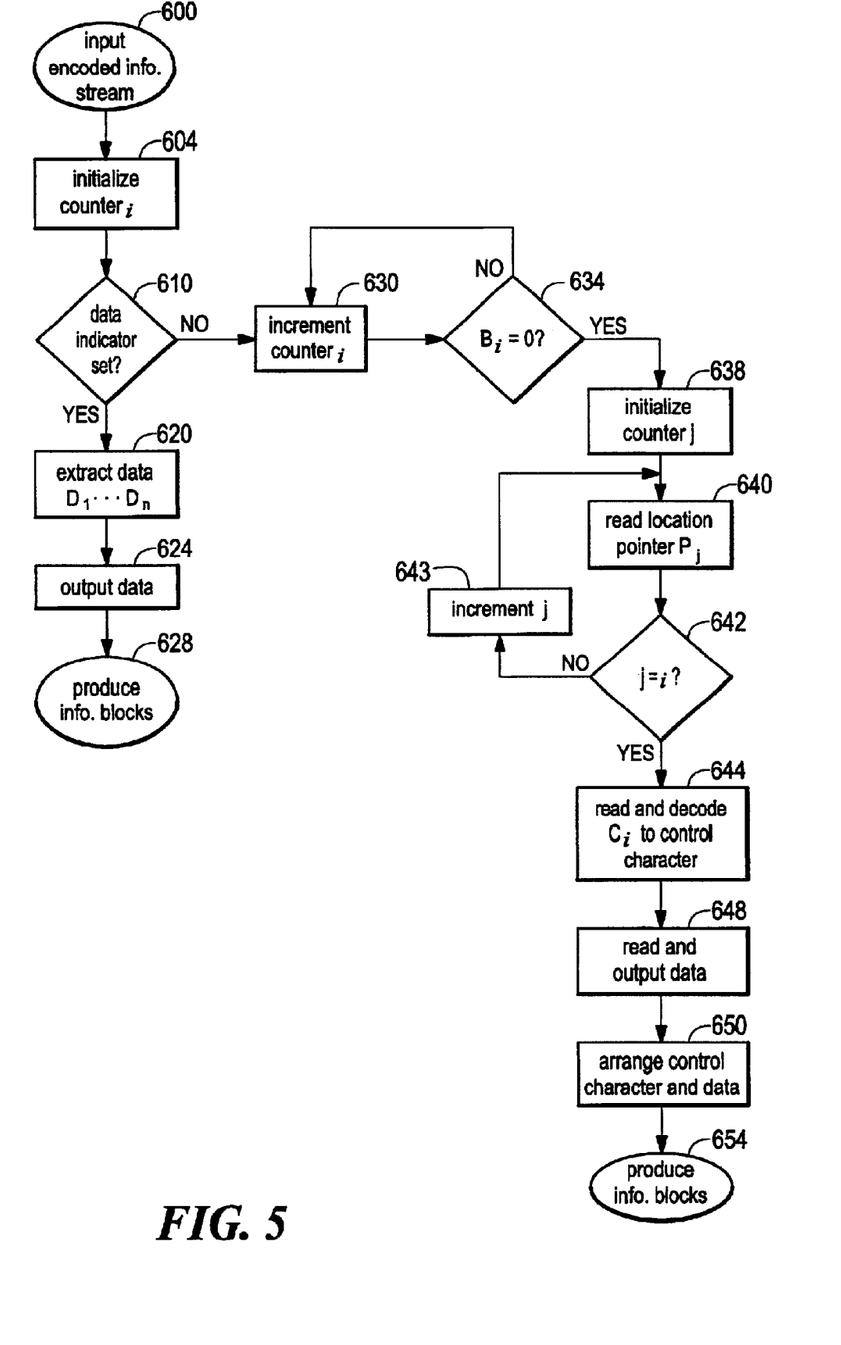
FIG. 5 is a flowchart for a decoding algorithm according to an embodiment of the present invention.
Figure 6:
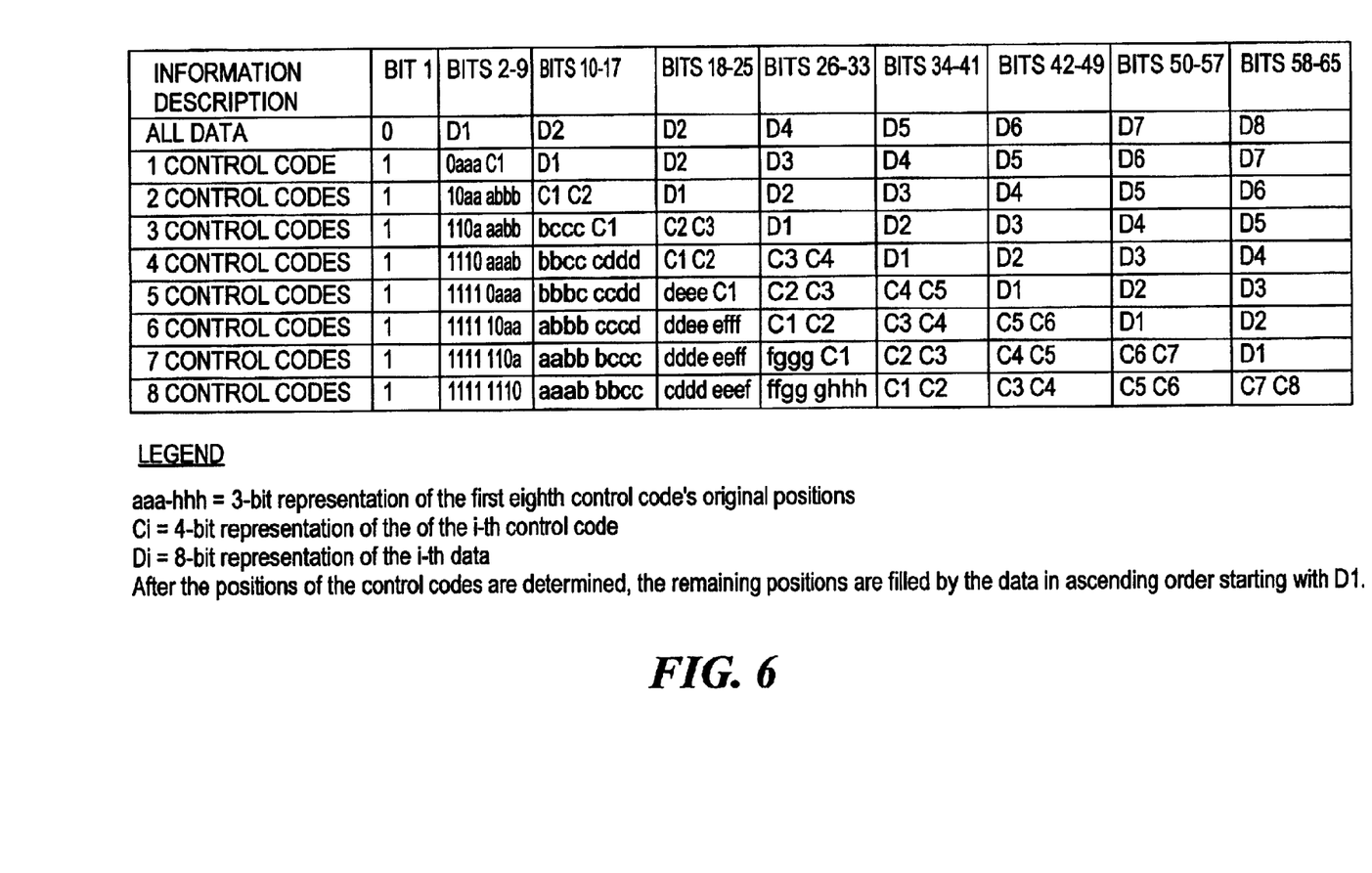
FIG. 6 illustrates the bit field configuration utilizing a coding scheme according to another embodiment of the present invention.

FIGS. 4 and 5 are flowcharts illustrating encoding and decoding algorithms for transmitting GbE data and control characters in embodiments of the present invention. FIG. 6 illustrates one example of the configurations for the encoded information stream 400 that may be generated according to the present encoding algorithm. In FIG. 4, eight 10-bit blocks are input to the transmitting portion 200 of a communications link at step 500. Internal counters (i=1, j=0, and k=0, where i counts the number of input blocks, j counts the number of control character blocks, and k counts the number of data blocks) are initialized at step 510. A determination is made at step 520 as to whether the block $L_i$ is a control character. If the block $L_i$ is not a control character, the data counter is incremented at step 530 and the block $L_i$ is output as a data word $D_k$ at step 534. Then, it is determined at step 550 whether all of the blocks $L_i$ have been analyzed (if i=8). If more blocks are to be analyzed, the block counter i is incremented at step 554 and then a determination is made at step 520 as to whether the next block $L_i$ is a control character.

If block $L_i$ is determined to be a control character at step 520, the control character counter j is incremented and a bit for the first field 414 is set ($B_j$=1) to an opposite logical level from the data indicator at step 540. Next, the control character in block $L_i$ is encoded to a control code $C_j$ at step 544 and a location pointer $P_j$ for the second field 418 is generated for control code $C_j$ at step 548 to indicate the sequential position of the control character within the information group. Again, it is determined at step 550 whether all of the blocks $L_i$ have been analyzed (if i=8). If more blocks are to be analyzed, the block counter i is incremented at step 554 before returning to step 520 where these steps are repeated until the last block $L_i$ is determined to have been reached at step 550.

When the last block ($L_8$) is reached, a bit is set ($B_{j+1}$=0) in the first field at step 560 for indicating a transition to data fields or that the next encoded information stream will occur after the final control code. Finally, the encoded information stream 400 is generated at step 568. Depending upon the information group, the encoded information stream 400 includes the data indicator $414_1$ and the data fields $420_1, \ldots 420_n$ when only data is present or the first and second fields $414_w$ and $418_z$, the control sub-field(s) $430_x$, and possibly the data field(s) $420_y$ when at least one control character is present in the information group. These fields can be arranged in any of a variety of different orders, as desired by the user, within the constraints as described above.

A decoding algorithm for an embodiment of the present invention is next described with reference to FIG. 5. The encoded information stream is received from the communications link and input to the receiving portion 300 at step 600. Counters are initialized (i=0) at step 604. Next, it is determined at step 610 whether the data indicator $414_1$ is set ($B_1$=0). If the data indicator $414_1$ is set, the deserializer 311 extracts the data fields ($D_1, \ldots D_8$) at step 620 and then the decoder 321 passes these fields as 8-bits of data to the codec 341 at step 624. Finally, the codec 341 outputs the eight 10-bit data blocks of the information group at step 628.

If the data indicator $414_1$ is not set ($B_1$=1) the counter i is incremented at step 630 and the transition indicator is determined by counting bits $414_1, \ldots 414_w$ in the first field 414 until the transition indicator $414_w$ is detected. This is accomplished by analyzing the bits in the predetermined positions of the first field 414 ($B_i$) until a bit set to "0" is encountered at step 634. If the bit is not set to "0", the counter i is incremented again at step 630. Counter i counts the number of "1" bits encountered in the first field 414 which is used to determine the number of control codes present in the encoded information stream 400.

After the transition indicator $414_w$ ("0" bit) is encountered in the first field 414, the location pointer(s) $P_j$ are read from the predetermined positions of the second field 418. The size of the second field 418 is determined by multiplying the number of counted control codes (i) and the predetermined size of each sub-field $418_z$. In one example, if four control codes are counted and the size of each sub-field $418_z$ is three, then the size of the second field is 12 bits. To read the location pointer(s) $P_j$ a counter j is initialized (j=1) at step 638. Then, the location pointer $P_1$ is read from the second field 418 at step 640. At step 642, the counter j is compared to the number of control codes that have been counted (counter i) in the encoded information steam 400. If j≠i, there is at least one more location pointer $P_j$ to be read from the second field 418. Therefore, the counter j is incremented at step 643 and the next location pointer is read at step 640. However, if j=i, then all of the location pointer(s) $P_j$ have been read and the control codes $C_i$ may be now read at step 644.

Because the number of control codes $C_i$ has been counted, the sizes of the first and second fields 414 and 418 have been determined, and the size of each control code sub-field $430_x$ is known, the control code sub-field(s) $430_x$ may be read and decoded to control characters at step 644. Next, any remaining fields will correspond to data field(s) $D_k$ and the data field(s) 420$_y$ may be read by the rate optimizing decoder 320 at step 648. Using the location pointer(s) $P_j$, the order of the control characters are known so that the control characters and the data may be ordered by the rate optimizing decoder 320 at step 650. Then, the output blocks of control character(s) and any present data may be output from the codec 340 in their original GbE format at step 654. Accordingly, the coding scheme according to the present embodiments allows efficient and transparent transport of information groups over a communications link having a reduced data carrying capacity.

It will be apparent to those skilled in the art that other modifications to and variations of the above-described techniques are possible without departing from the inventive concepts disclosed herein. Accordingly, the invention should be viewed as limited solely by the scope and spirit of the appended claims.

What is claimed is:

1. A method for transporting multi-word information groups containing data words and control characters over a communications link, comprising the steps of:
   (a) determining whether each of said information groups includes control characters;
   (b) for each information group that does not include control characters, setting a data indicator and combining said data indicator with the data words of the information group to generate an encoded information stream including said data indicator and the data words; and
   (c) for each information group that includes one or more control characters, generating an encoded information stream by the steps of,
   (i) encoding the control characters to control codes,
   (ii) generating a transition indicator based on the number of control characters for indicating the occurrence of a final control code in the encoded information stream,
   (iii) generating a location pointer for each of the control codes representative of the sequential position within the information group for each of the corresponding control characters, and
   (iv) combining the control codes, the data words, said location pointers, and said transition indicator for each information group to form the encoded information stream.

2. The method according to claim 1, wherein a data-carrying capacity for the communications link is less than the signaling rate of said information group.

3. The method according to claim 1, wherein each of said information groups comprises a predetermined number of words and each of said words comprise a predetermined number of bits.

4. The method according to claim 1, wherein the number of bits in the encoded information stream is less than the number of bits in said information group.

5. The method according to claim 1, wherein said step (b) further comprises the step of setting a first bit to a first logical level as said data indicator when the information group does not include control characters.

6. The method according to claim 5, wherein said step (c) further comprises the step of setting said bit to a second logical level opposite to said first logical level when the information includes one or more control characters.

7. The method according to claim 1, further comprising the steps of:
   (d) receiving the encoded information stream from the communications link;
   (e) determining whether said data indicator is set;
   (f) when said data indicator is set, extracting the data words from the encoded information stream to re-generate the information group;
   (g) when said data indicator is not set, generating the information group by the steps of,
   (i) based on the value of said transition indicator, determining the locations of said location pointers, said control codes, and said data words in said encoded information stream,
   (ii) reading said location pointers, said control codes, and said data words from said encoded information stream,
   (iii) decoding said control codes to said control characters, and
   (iv) arranging said control characters and said data words based on said location pointers to generate each of the information groups.

8. The method for transporting multi-word information groups containing data and control characters over a communications link, comprising the steps of:
   (a) encoding each of said information groups to an encoded information stream including a data indicator and data words when said information group does not include control characters; and
   (b) encoding control characters to control codes, generating a transition indicator and location pointers, and combining said control codes, said transition indicator, said location pointers, and any data words present in said information group to form said encoded information stream when one or more control characters are included in said information group.

9. The method according to claim 8, wherein said step (a) further comprises the step of generating the encoded information stream to include a plurality of data fields when said information group does not include control characters, the number of said data fields corresponding to the number of words in said information group.

10. A method for transporting multi-word information groups containing data and control characters over a communications link, comprising the steps of:
   (a) encoding each of said information groups to an encoded information stream including a data indicator and data words when said information group does not include control characters; and
   (b) encoding control characters to control codes, generating a transition indicator and location pointers, and combining said control codes, said transition indicator, said location pointers, and any data words present in said information group to form said encoded information stream when one or more control characters are included in said information group,
   wherein said step (a) further comprises the step of generating the encoded information stream to include a plurality of data fields when said information group does not include control characters, the number of said data fields corresponding to the number of words in said information group, and
   wherein said encoded information stream comprises a first variable length bit field for storing control code counters and said transition indicator, a second variable length bit field for storing said location pointers, a third variable length bit field for storing said control codes, and a fourth variable length bit field for storing any data words present.

11. A system for transporting multi-word information groups containing data words and control characters over a communications link, comprising:
- a rate optimizing encoder for determining whether each of said information groups includes control characters, for each information group that does not include control characters, said rate optimizing encoder setting a data indicator and ordering said data indicator and the data words, and for each information group that includes one or more control characters, encoding the control characters to control codes, generating a transition indicator and a location pointer for each of the control codes, and ordering said transition indicator, said location pointers, said control codes and any data words; and
- a serializer for generating an encoded information stream by combining said data indicator and the data words for each information group that does not include any control characters, and by combining said transition indicator, said location pointers, said control codes and any data words for each information group that includes one or more control characters.

12. The system according to claim 11, wherein said encoded information stream comprises control code counters for indicating the number of control codes that are present.

13. The system according to claim 12 wherein said transition indicator is generated based on the number of control characters that are present.

14. The system according to claim 11, wherein a data-carrying capacity for the communications link is less than the signaling rate of said information groups.

15. The system according to claim 11, wherein each information group comprises a predetermined number of words and each word comprises a predetermined number of bits.

16. The system according to claim 11, wherein the number of bits in the encoded information stream is less than the number of bits in said information group.

17. The system according to claim 11, further comprising:
- a deserializer for extracting said data indicator and predetermined sized blocks from said encoded information stream; and
- a rate optimizing decoder for determining whether said data indicator is set, when said data indicator is set, said rate optimizing decoder extracting said predetermined sized blocks of data to re-generate said information groups, and when said data indicator is not set, said rate optimizing decoder extracting said transition indicator, said location pointers, said control codes and any data words from said predetermined sized blocks, decoding said control codes to said control characters, and ordering said control characters and any data words based on said location pointers to re-generate said information groups.

18. The system according to claim 11, wherein said transmitting portion further comprises a transmitting codec for encoding data formats to block line codes of the data words and control characters.

19. The system according to claim 18, wherein said receiving portion further comprises a receiving codec for decoding block line codes of the data words and said control characters back to the data formats.

20. A system for transporting multi-word information groups containing data words and control characters over a communications link, comprising:
- a rate optimizing encoder for determining whether each of said information groups includes control characters, for each information group that does not include control characters, said rate optimizing encoder setting a data indicator and ordering said data indicator and the data words, and for each information group that includes one or more control characters, encoding the control characters to control codes, generating a transition indicator and a location pointer for each of the control codes, and ordering said transition indicator, said location pointers, said control codes and any data words;
- a serializer for generating an encoded information stream by combining said data indicator and the data words for each information group that does not include any control characters, and by combining said transition indicator, said location pointers, said control codes, and any data words for each information group that includes one or more control characters;
- a deserializer for extracting said data indicator and predetermined sized blocks from said encoded information stream; and
- a rate optimizing decoder for determining whether said data indicator is set, when said data indicator is set, said rate optimizing decoder extracting said predetermined sized blocks of data to re-generate said information groups, and when said data indicator is not set, said rate optimizing decoder extracting said transition indicator, said location pointers, said control codes and any data words from said predetermined sized blocks, decoding said control codes to said control characters, and ordering said control characters and any data words based on said location pointers to re-generate said information groups,
- wherein said encoded information stream comprises a first variable length bit field for storing control code counters and said transition indicator, a second variable length bit field for storing said location pointers, a third variable length bit field for storing said control codes, and a fourth variable length bit field for storing any data words that are present.

* * * * *

UNITED STATES PATENT AND TRADEMARK OFFICE
CERTIFICATE OF CORRECTION

PATENT NO. : 6,952,405 B2 Page 1 of 1
APPLICATION NO. : 09/794949
DATED : October 4, 2005
INVENTOR(S) : Danny Hin-Kwok Tsang et al.

It is certified that error appears in the above-identified patent and that said Letters Patent is hereby corrected as shown below:

Column 4, line 57, "414and" should read --$414_1$ and--;

Column 5, line 38, "$414_w$" should read --$414_w$--;

Column 5, line 48, "418," should read --$418_z$--; and

Column 10, claim 8, line 20, "The method" should read --A method--.

Signed and Sealed this

Twenty-ninth Day of August, 2006

JON W. DUDAS
*Director of the United States Patent and Trademark Office*

(12) SUPPLEMENTAL EXAMINATION CERTIFICATE

United States Patent
Tsang et al.

(10) Number: US 6,952,405 F1
(45) Certificate Issued: Sep. 4, 2014

Control No.: 96/000,060
Primary Examiner: Luke S. Wassum

Filing Date: Jun. 20, 2014

No substantial new question of patentability is raised in the request for supplemental examination. See the Reasons for Substantial New Question of Patentability Determination in the file of this proceeding.

(56) Items of Information

OTHER DOCUMENTS

"Protocol-Independent Transparent Mapping of 8B/10B Block-Coded Client Signals Using Standard GFP Encapsulation", dated December 22, 2000, by Mike Scholten, Steve Gorshe, and Danny Tsang.

"Proposed Text for draft Generic Framing Procedure Standard on Protocol-Independent Transparent Mapping of 8B/10B Block-Coded Client Signals", dated December 29, 2000, by Mike Scholten, Steve Gorshe, and Danny Tsang.

"Transparent Mapping of 8B/10B Block-Coded Client Signals Using Standard GFP Encapsulation", dated January 8, 2001, by Mike Scholten, Ben Brown, Steve Gorshe, and Danny Tsang.

"Transparent Mapping of 8B/10B Block-Coded Client Signals Using Standard GFP Encapsulation (Presentation Slides for Contribution T1X1.5/2001-004R1)", undated, by Mike Scholten, Ben Brown, Steve Gorshe, and Danny Tsang.

U.S. Provisional Patent Application 60/251,341 to Murat Azizoglu and Danny Tsang, filed December 5, 2000.